United States Patent [19] [11] 3,956,062
Smith [45] May 11, 1976

[54] CONTINUOUS PILE DISCHARGING MACHINE
[75] Inventor: Phillips P. Smith, Richland, Wash.
[73] Assignee: The United States of America as represented by the United States Energy Research and Development Administration, Washington, D.C.
[22] Filed: May 11, 1976
[21] Appl. No.: 212,035

[52] U.S. Cl. .................................. 176/30; 214/29; 176/61
[51] Int. Cl.² ....................................... G21C 19/20
[58] Field of Search ............... 81/3, 3.05, 3.2, 3.31, 81/3.33, 3.38, 3.46, 71, 90; 204/154.2; 214/29; 176/30, 61

[56] References Cited
UNITED STATES PATENTS

| 344,233 | 5/1886 | Green | 8/3 |
|---|---|---|---|
| 1,024,623 | 4/1912 | Dougherty | 204/154.2 |
| 1,278,307 | 9/1918 | Cressler | 214/24 |
| 1,296,998 | 2/1919 | Nieznalski | 214/24 |
| 1,697,811 | 1/1929 | Dailey | 204/154.2 |
| 2,496,672 | 2/1950 | Newman | 81/3.88 |
| 2,542,329 | 2/1951 | Hammond, Jr. | 81/3.46 |

Primary Examiner—Samuel Feimberg
Assistant Examiner—S. A. Cangialosi
Attorney, Agent, or Firm—Dean E. Carlson; Arthur A. Churm; Lee P. Johns

[57] ABSTRACT

A device for discharging cartridges from tubes under fluid pressure includes a cylindrical housing adapted to be seated in a leak-tight manner on the end of one of the tubes, a chute depending from the cylindrical housing near the end seated on the end of the tube, a rotatable piston having a wrench on the forward end thereof disposed in the cylindrical housing and adapted to manipulate a plug in the end of the tube, and a telescopic hydraulic ram adapted to move the piston toward the plug. In addition the wrench contains a magnet which prevents inadvertent uncoupling of the wrench and the plug.

7 Claims, 10 Drawing Figures

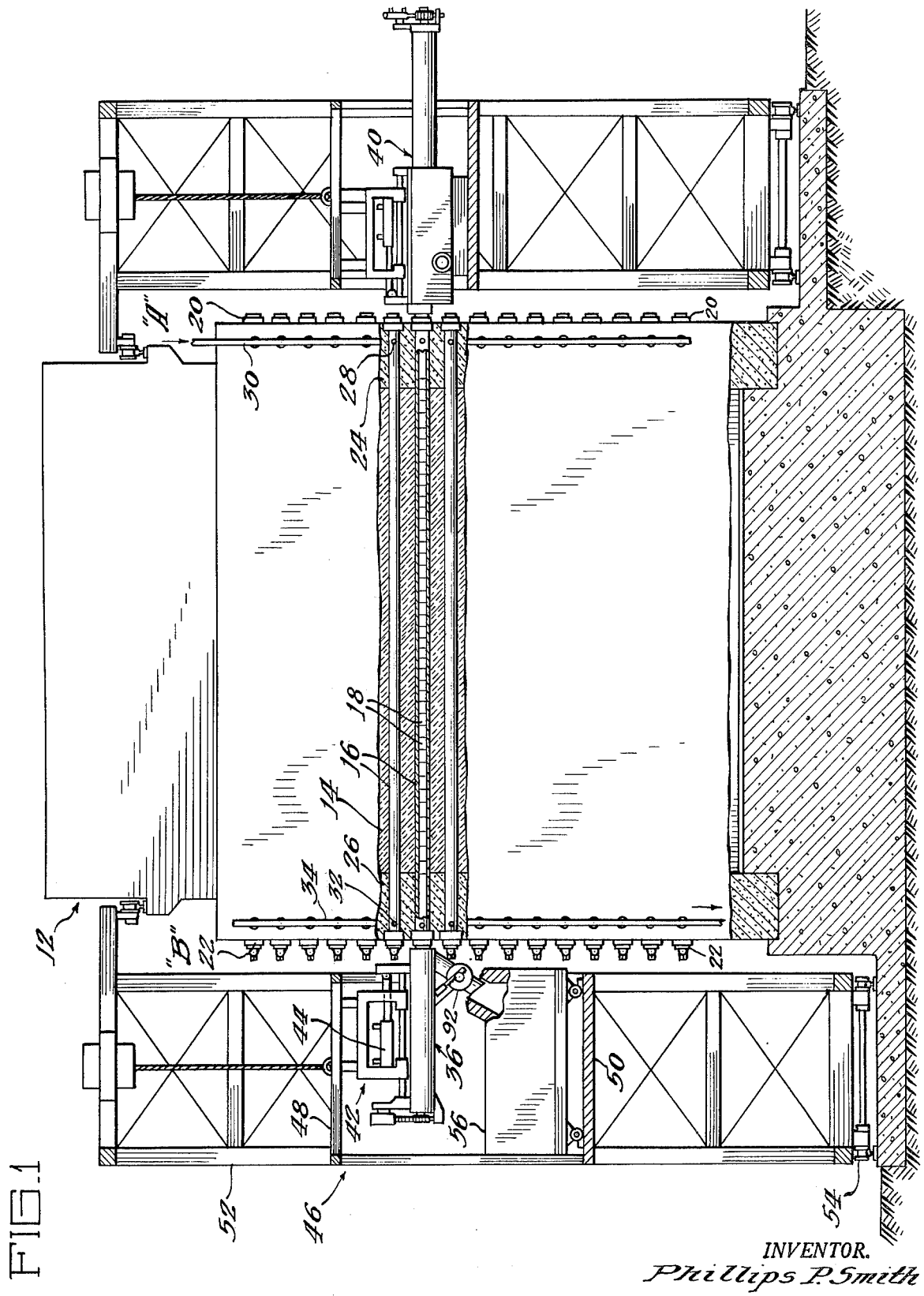

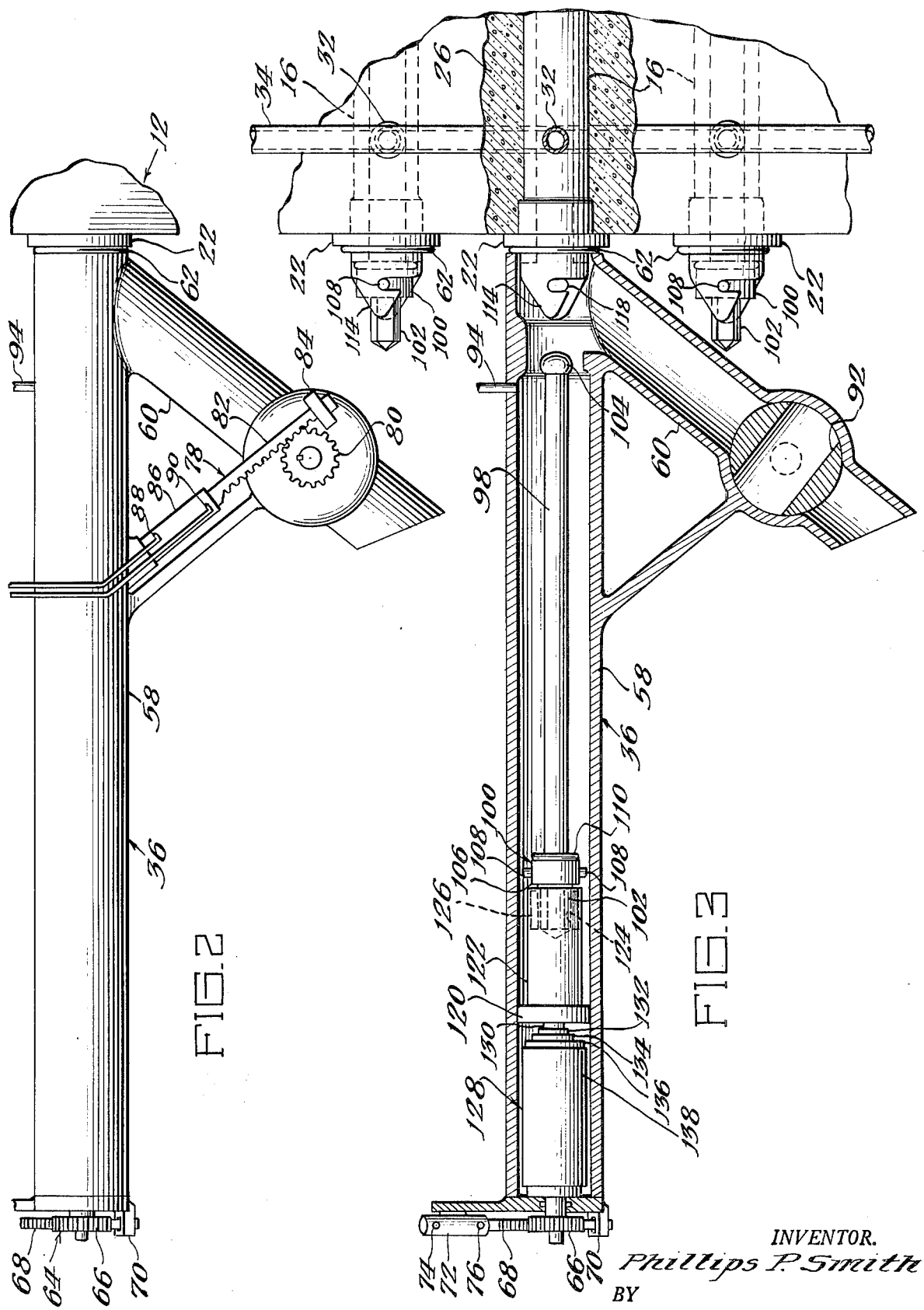

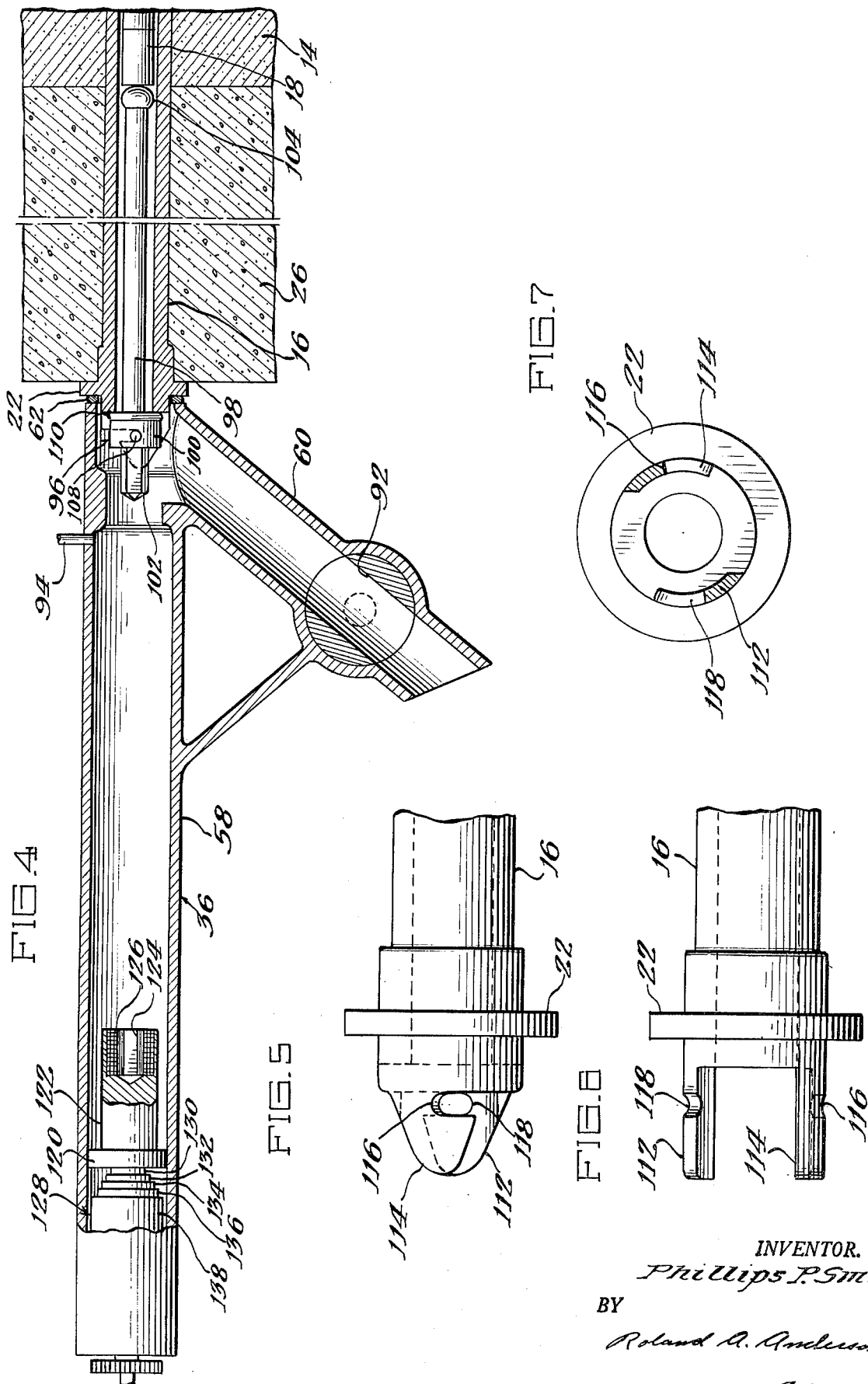

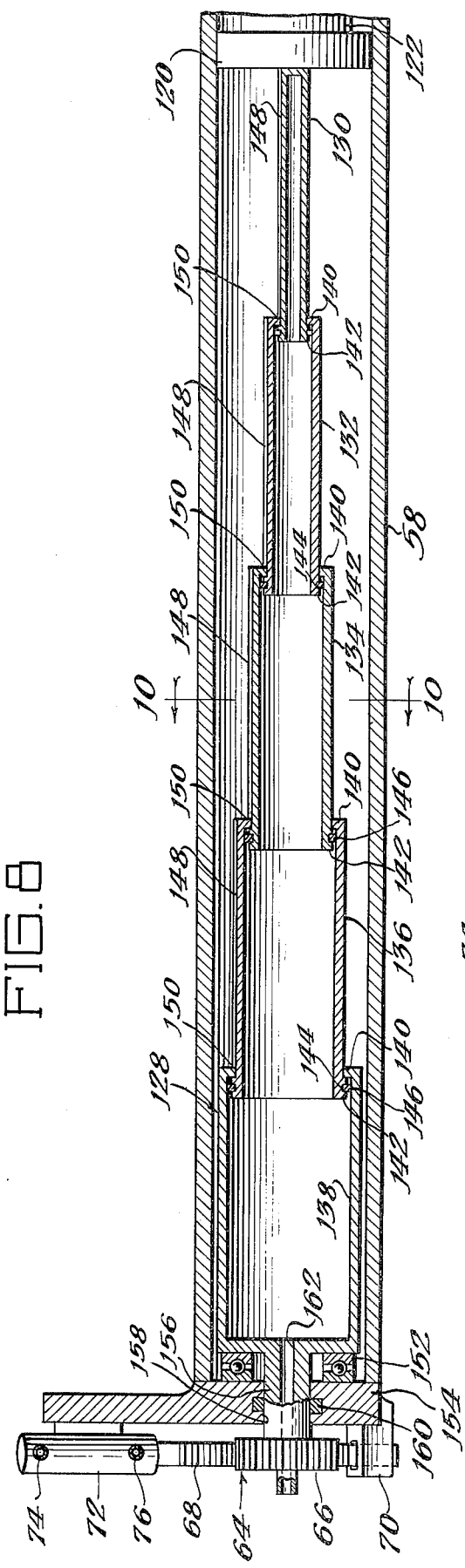
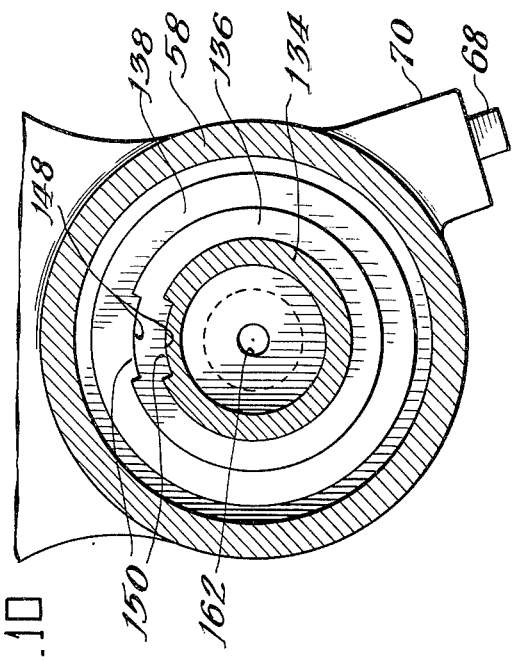
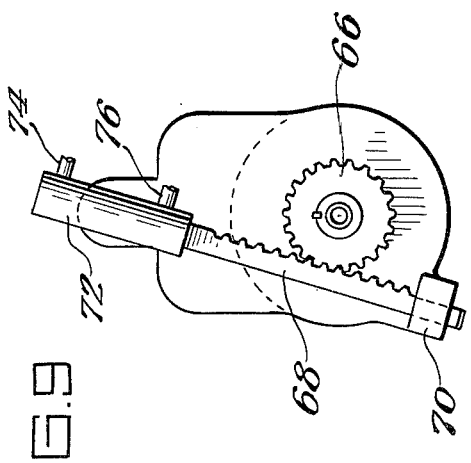

3,956,062

CONTINUOUS PILE DISCHARGING MACHINE

This invention relates to a device for discharging or unloading cartridges from a tube. It is intended primarily for the discharging of cartridges of fissionable material from process tubes of a neutronic reactor while a cooling medium is continuously flowing through the tubes under pressure.

In a neutronic reactor bodies, or slugs as they are sometimes called, of neutron fissionable isotopes are arranged in a neutron moderator in such a manner as to produce a self-sustaining neutronic reaction. Such reaction is satisfactorily sustained by fissionable isotopes such as $U^{233}$, $U^{235}$ or $94^{239}$. By virtue of the fissions occurring within said isotopes fast neutrons are evolved and their energies are reduced as a result of successive collisions with nuclei of the moderating material. The resulting slow neutrons may then be absorbed by the nuclei of the fissionable material to produce additional fissions. Typical moderators suitable for use in neutronic reactors are graphite, beryllium, and heavy water.

Since the details of construction and operation of neutronic reactors form no part of the present invention a complete description thereof is unnecessary. For such information, however, reference is made to Pat. No. 2,708,656 issued to Enrico Fermi and Leo Szilard on May 17, 1955.

The usual type of neutronic reactor embodies an active portion comprising a plurality of horizontal tubes geometrically arranged within a neutron moderator. Each tube has a charging end on one side of the moderator and a discharging end on the opposite side. The bodies of fissionable material are loaded into the tubes at their charging ends and when removed from the reactor the bodies leave through the discharging ends of the tubes.

During the process of fission, there is an evolution of heat which necessitates the circulation of a cooling medium, such as water, through the process tubes and in heat exchange relationship with the slugs at high pressure in order to control the reaction at high energy levels over any extended period of operation. This cooling medium circulates over the sides of the slugs that are disposed in end-to-end relationship in each tube. During the fission process high energy gamma rays as well as beta rays and alpha particles are emitted in addition to the neutrons. This emission of gamma rays in particular continues even after the fission process has been discontinued causing a continuation of the highly radioactive state that exists during the reaction. A great amount of heat is evolved both as a result of the fission process and of the radioactive emissions that take place during and after the termination of the fission process. It is this heat that is removed by the cooling medium.

After the neutronic reaction has been carried on for a period of time, it may become desirable for sake of maximum efficiency or for some other reason to replace the fissionable bodies or slugs with fresh ones. It is of course most desirable for maximum efficiency of operation to accomplish this, if possible, without shutting down the reactor. This presents a problem since replacement of the slugs involves entering the process tubes. Since these tubes must be constantly full of coolant under pressure while the reaction continues the problem centers on the question of replacing irradiated slugs without spilling coolant or exposing operating personnel to the serious hazards resulting from the harmful radioactive radiations emanating from the tube interiors. This all requires very special precautions and the use of handling equipment that can perform the required tasks and at the same time will afford the proper safeguards for protecting the operating personnel.

It is the primary object of this invention to obviate the delay caused by the shutdown of the reactor and to permit replacement of bodies or slugs of fissionable material while the reactor is under full power operation. With this objective in mind, the machine embodying this invention was designed to unseal the process tube and facilitate discharge of the highly radioactive slugs by some remotely governed means while at the same time permitting coolant medium to flow through the tube at full pressure. This is accomplished without loss of contaminated water. The device is entirely operated by mechanical means and was designed to provide maximum flexibility of reactor operation permitting continuous slug by slug discharge, as well as partial or full tube discharge.

In addition to the objects and advantages already described, others will be apparent from the following description and drawings in which:

FIG. 1 is a diagrammatic view of a neutronic reactor showing the discharging device that is the subject matter of the present invention in position on the "B" or discharge side to receive cartridges or slugs of fissionable material from a reactor, and also showing a charging device in position on the "A" or charging side;

FIG. 2 is an enlarged side elevational view of the machine embodying the present invention;

FIG. 3 is a longitudinal sectional view, shown partly in elevation of the device shown in FIG. 1 and showing the device attached to the discharge end of a process tube after the plug for said tube has been removed;

FIG. 4 is a longitudinal sectional view shown partly in elevation of the device showing the device attached to the discharge end of a process tube before the plug has been removed from said tube;

FIG. 5 is an enlarged fragmentary side elevational view of a process tube nozzle showing bayonet lug slots;

FIG. 6 is a plan view of the nozzle shown in FIG. 5;

FIG. 7 is an end view of the tube nozzle shown in FIGS. 5 and 6;

FIG. 8 is an enlarged longitudinal sectional view of the device showing the hydraulic ram in section and in an extended position;

FIG. 9 is an end view of the device shown in FIG. 8; and

FIG. 10 is an enlarged transverse sectional view of the device, the view being taken on the line 10—10 of FIG. 8.

For the purposes of the present invention only those portions of the reactor regarded as necessary for an understanding of the invention will be explained. Referring to FIG. 1 of the drawings a neutronic reactor is generally indicated at 12. This reactor comprises a moderator 14, such as graphite, a plurality of horizontal tubes 16 disposed therethrough and adapted to accommodate a plurality of cartridges or slugs of fissionable material 18 that may be arranged end-to-end therein.

For purposes of illustration, the reactor 12 has a charging side "A" where the slugs 18 are charged into the tubes 16 through charging nozzles 20. Likewise, there is a discharging side "B" where said slugs are removed from the tubes 16 through discharging nozzles 22. The charging side "A" is provided with a shield 24 that serves to absorb the neutrons and harmful radioactive radiations that would otherwise escape from the rector. A similar shield 26 is disposed across the face of the discharging side "B" for the same purpose. Between the shields 24 and 26 are located the active elements of the reactor, namely, the moderator 14 and the slugs 18 in the process tubes 16. In order to provide a constant flow of cooling medium through each process tube, an inlet 28 is disposed in the side wall of each tube 16 near the charging nozzle 20. Similar inlets in all the tubes 16 connect with a supply pipe 30. In this manner a coolant, such as water, entering at the charging end from the supply pipe 30 and through the inlet 28 circulates through the tube 16 and over the surfaces of the cartridges or slugs 18 to the discharge end of the tube. Here the cooling medium leaves the tube 16 through an outlet 32 provided in the side wall thereof in a manner similar to that of the inlet 28 and enters a return pipe 34 that is common to all outlet parts 32.

A discharging device generally indicated at 36 and constituting the subject matter of the present invention is shown attached to the discharge nozzle 22 of one process tube 16. Attached to the same tube 16 at the other end is a suitable charaging device generally indicated at 40 which for purposes of illustration can be of the type disclosed in Pat. No. 2,725,993 issued to me on Dec. 6, 1955.

The discharging device 36 is suspended from a supporting apparatus generally indicated at 42 which includes among other things a hydraulic ram 44. The supporting apparatus 42 is sustained in place by an elevator generally indicated at 46 having a cross-beam 48 and a platform 50. An elevator structure 52 supporting said elevator is mounted on wheels 54 and adapted to move horizontally across the face of the reactor on the discharging side "B". In this manner free access may be had by the operator of the discharging device to any discharging nozzle 22. Moreover, by use of the hydraulic ram 44, an operator standing on the platform 50 can manipulate the discharging device 36 into and out of engagement with the discharge nozzle 22 on the discharge end of the particular tube 16. Finally, a slug receptacle 56 is mounted on the platform 50 of the elevator 46 beneath the discharging device 36 in such manner as to receive the slugs 18 upon their removal from the tube 16.

The discharging device is best shown in FIGS. 2 to 4, inclusive, and comprises a fluid-tight housing means including an elongated cylinder 58 and a chute 60 extending at an acute angle from one end of said cylinder. The same end of the cylinder 58 is attached to the discharging nozzle 22 which extends beyond the discharging side "B" of the reactor 12. When this end of the cylinder 58 is forcibly seated on the nozzle 22, a leakproof fit is assured by an annular sealing gasket 62 attached to the nozzle. At the opposite end of the cylinder 58 is disposed a turning gear drive generally indicated at 64 which includes a pinion 66 and a rack 68 as shown in FIG. 9. The lower end of the rack 68 is provided with a rack guide 70 and the upper end is disposed within a hydraulic cylinder 72 by which it is actuated. Said cylinder is provided with two ports 74 and 76, one at each end which are connected to a hydraulic source, not shown in the drawing.

Returning to FIG. 2 a second turning gear drive, generally indicated at 78, is disposed below the cylinder 58 and adjacent the chute 60. In every respect the gear drive 78 is similar to the gear drive 64, there being provided a pinion 80, a rack 82, a rack guide 84 and a hydraulic cylinder 86 having two ports 88 and 90 at opposite ends thereof which are connected to a hydraulic source, not shown in the drawing. The purpose of the turning gear drive 78 is to actuate a rotary dumping valve 92 (FIG. 4) disposed in the lower end of the chute 60. This dumping valve 92 is shown in FIG. 4 in the open position and in FIG. 3 in the closed position. On top of the cylinder 58 near the end adjacent the nozzle 22 is disposed an air purge valve 94 to be more fully described hereinafter.

Referring now to FIG. 4, the discharging device 36 is shown in a position immediately after attachment to the nozzle 22. Specifically the tube 16 is closed in a fluid-tight manner by a plug generally indicated at 96. Said plug comprises three elements including a push bar 98, a locking member 100 and a hexagonal male member 102. The push bar 98 is an elongated shaft, the length of which extends from the locking member 100 to the inner face of the shield 26. On the end opposite the locking member 100, is a round head 104 having a diameter equal to that of the slug 18. The locking member 100 includes a circular body 106 having a pair of oppositely disposed bayonet locking lugs 108 on its periphery (FIG. 3), and having an annular gasket 110 mounted on the frontal face which provides the leak-proof seal between the plug and the outer face of the nozzle 22. The hexagonal male member 102 is integral with the locking member 100 and extends therefrom on the longitudinal axis of the assembly.

As shown in FIGS. 5, 6 and 7 a pair of bayonet receiving guides 112 and 114 extend longitudinally from the nozzle 22. They are oppositely disposed and contain bayonet lug slots 116 and 118 adapted to receive the bayonet lugs 108 when the plug 96 is locked in place within the tube 16.

Referring to FIG. 4 again, at the end of the cylinder 58 remote from the nozzle 22 is disposed a piston 120 having a wrench 122 integral therewith on the side facing said nozzle. The wrench 122 contains a hexagonal bore 124 adapted to receive the hexagonal male member 102, which is held in place by a magnet 126 about said bore. The magnetic force within the bore 124 is sufficient to prevent dislodging of the member 102, but the disengagement of this coupling, which results upon the application of sufficient force to overcome the magnetic force, prevents the damaging of the reactor which might otherwise result if the ram were accidentally withdrawn with the bayonet coupling engaged. On the other side of the piston 120 is a means to reciprocate said piston and wrench including a telescopic hydraulic ram generally indicated at 128. In FIGS. 3 and 4, the ram 128 is shown in the contracted position, while in FIG. 8 it is shown fully expanded. The ram 128 is composed of sections 130, 132, 134, 136, and 138 that are adapted to fit within each other telescopically. In its expanded position, as shown in FIG. 8, the ram 128, when filled with a hydraulic fluid, drives the piston 120 throughout the length of the cylinder 58. In order to prevent said sections from becoming disengaged, each section except section 130 is provided with an annular shoulder 140 extending radially inwardly at the forward end thereof. At the opposite end, is an annular flange 142 which is adapted to abut the annular shoulder 140 of the outer section when the ram is fully extended. In addition, an annular groove 144 is disposed about the outer periphery of each flange 142 and is adapted to provide a seat for an annular gasket 146 therein. By virtue of said gaskets the interfitting sections are slidably disposed with respect to each other in a leakproof manner. On each section, except section 138, is a longitudinal keyway 148. Into said keyway fits a key 150 extending radially inward on the annular shoulder 140. This is more clearly shown in FIG. 10.

At the end of the ram 128, remote from the piston 120 (FIG. 8), the section 138 is rotatably mounted upon an annular bearing 152 disposed between said section and an end plate 154 of the cylinder 58. A trunnion 156, integral with the section 138, extends along the longitudinal axis of the cylinder through an aperture 158 in the end plate 154 and through the pinion 66 of the gear drive 64. Said aperture is provided with a packing 160 to prevent leakage of cooling medium from within the cylinder 58. A bore 162 provides an inlet and outlet for hydraulic fluid for the ram, the fluid being forced therein from a source, not shown in the drawing.

OPERATION

Operation of the invention begins by raising the device 36 (FIG. 1) on the elevator 46 and bringing it in alignment with a particular tube 16. The ram 44 is then operated to bring the device 36 into a fluid-tight fitting with the nozzle 22. The lead-lined slug receptacle 56 is then aligned with the lower end of the chute 60. These preparations constitute the preliminary acts necessary for the use of the invention and the situation is shown in FIGS. 1 and 4.

Referring particularly to FIG. 4, the rotary dumping valve 92 is closed, thereby creating a fluid-tight housing over the end of the tube 16. Hydraulic fluid is then forced into the hydraulic ram 128 causing it to expand to the position shown in FIG. 8. At the same time the hexagonal bore 124 is seated over the male member 102 and the hydraulic cylinder 72 of the gear drive 64 is actuated to unlock the bayonet joint. The gear drive 64 causes the hydraulic ram 128 together with the piston 120 and the wrench 122 to rotate. The rotary movement of the various sections of the ram 128 is transmitted therethrough via the keys 150 and from the section 130 to the piston 120 which are integral parts. The rotary movement unlocks the bayonet lugs 108 from their respective bayonet slots 116 and 118 and the pressure of the cooling medium within the tube 16 is now borne by the ram 128.

By reducing the pressure of the hydraulic fluid within said ram, the force of the cooling medium within the tube 16 dislodges the assembly of the plug 96 driving it out of the nozzle 22. The entire volume within the cylinder 58 and chute 60 are filled with fresh, uncontaminated coolant (from a cource not shown but attached to chute), the air therein being purged through the purge valve 94. As the pressure of the cooling medium within the cylinder 58 attains that of the medium within the tube 16, the piston 120 is driven to the point of full retraction, as shown in FIG. 3. In such position, the device 36 is ready to receive cartridges or slugs 18 of fissionable material as they are pushed out of the tube 16 to make place for fresh cartridges or slugs 18 being charged at the other end. As the slugs 18 are emitted from the nozzle 22, they drop into the chute 60 which is gradually filled.

When the charging of the tube 16 is completed and the chute 60 is filled, the plug 96 is returned to its locked position within the nozzle 22 by reversing the above-described procedure; namely, increasing the pressure of the ram 128 over that of the cooling medium. Manifestly, as the head 104 on the advance end of the push bar 98 enters the tube 16, the last remaining slug 18 of fissionable material not to be discharged is disposed there. This fact necessitates increasing the pressure of the ram 128 even greater, forcing the series of the slugs 18 within the tube 16 backward into said tube until the plug 96 is disposed in the position shown in FIG. 4. Here it is evident that the last remaining slug 18 is contained in the tube 16 and within the moderator 14.

With the return of the plug 96 to its locked position in the tube 16, the dumping valve 92 in the chute 60 is turned to the open position, as shown in FIG. 4, permitting the discharged slugs 18 to drop into the slug receptacle 56 (FIG. 1). Thereafter the discharging device 36 is detached from the nozzle 22 by reversing the hydraulic ram 44. The device 36 is then ready for another operation.

Since certain changes can be made in the foregoing device and different steps may be employed in practicing the same, it is intended that all matter shown in the accompanying drawings and described hereinafter shall be interpreted as illustrative only and may be modified without departing from the intended scope of the invention.

What is claimed is:

1. A device for discharging cartridges from tubes under fluid pressure where such tubes have a charging end and a discharging end for accommodation of cartridges, and where such charging and discharging ends are closed with removable plugs, comprising a fluid-tight housing having an aperture adapted to fit the discharging end of the tube in a fluid-tight manner, the housing including a cylinder aligned with the aperture, a piston including a rotatable ram in the cylinder, means to reciprocate said ram and piston, and a wrench on the forward end of the piston adapted to engage and manipulate the plug sealing the end of the tube.

2. A device for discharging cartridges from tubes under fluid pressure where such tubes have a charging end and a discharging end for accommodating the cartridges, and where such charging and discharging ends are closed with removable plugs, comprising a fluid-tight housing having an aperture adapted to fit the discharging end of the tube in a fluid-tight manner, the housing including a cylinder aligned with the aperture, a rotatable piston in the cylinder, and a wrench on the forward end of the piston.

3. A device for discharging cartridges from tubes under fluid pressure where such tubes have a charging end and a discharging end for accommodating the cartridges, and where such charging and discharging ends are closed with removable plugs, comprising a fluid-tight housing having an aperture adapted to fit the discharging end of the tube in a fluid-tight manner, the housing including a cylinder aligned with the aperture, a piston in the cylinder, a rotatable hydraulic ram in the cylinder adapted to reciprocate the piston by expanding and contracting telescopically, and a wrench on the forward end of the piston.

4. A device discharging cartridges from tubes under fluid pressure where such tubes having a charging end and a discharging end for accommodating the cartridges, and where such charging and discharging ends are closed with removable plugs, comprising a fluid-tight housing having an aperture adapted to fit the discharging end of the tube in a fluid-tight manner, the housing including a cylinder aligned with the aperture, a rotatable hydraulic telescopic ram in the end of the cylinder remote from the aperture, a piston in the cylinder coupled to the ram, a wrench on the forward end of the piston adapted to engage and manipulate a plug sealing the discharge end of the tube, the housing also including a chute adapted to receive the cartridges discharged from the tube, and a valve disposed at the lower end of said chute.

5. A device for discharging cartridges from tubes under fluid pressure where such tubes have a charging end and a discharging end for accommodating the cartridges, and where such charging and discharging ends are closed with removable plugs, comprising a fluid-tight housing having an aperture adapted to fit the discharging end of the tube in a fluid-tight manner, the housing including a cylinder aligned with the aperture, a rotatable hydraulic ram in the end of the cylinder remote from the aperture, a piston in the cylinder coupled to the ram, a wrench on the forward end of the piston, a magnet on the wrench adapted to manipulate and retain a plug sealing the discharge end of the tube the housing also including a chute near the aperture, and a valve disposed at the lower end of the chute.

6. An assembly comprising a closed housing except for an aperture at one end, the housing including a cylinder aligned with the aperture, a rotatable ram mounted at the end of the cylinder remote from the aperture, a piston in the cylinder attached to the ram, and a wrench on the forward end of the piston, the wrench having a hexagonal bore, the walls of the wrench at the bore being lined with a magnet.

7. An assembly comprising a closed housing except for an aperture at one end, the housing including a cylinder aligned with the aperture, a rotatable ram mounted at the end of the cylinder remote from the aperture, a piston in the cylinder attached to the ram, a wrench having a hexagonal bore, the walls of the wrench at the bore being lined with a magnet, a chute within the housing extending beneath it at an acute angle to the axis thereof and from a point adjacent the aperture, and a valve disposed in the chute.

* * * * *

UNITED STATES PATENT OFFICE
CERTIFICATE OF CORRECTION

Patent No. 3,956,062　　　　　　　　　Dated May 11, 1976

Inventor(s) Phillips P. Smith

It is certified that error appears in the above-identified patent and that said Letters Patent are hereby corrected as shown below:

In the United States Patent change the filing date "May 11, 1976" to --February 21, 1951--

Signed and Sealed this

Thirteenth Day of July 1976

[SEAL]

Attest:

RUTH C. MASON　　　　　　　　　　C. MARSHALL DANN
Attesting Officer　　　　　　　　Commissioner of Patents and Trademarks